United States Patent
Moran et al.

(10) Patent No.: US 11,891,012 B2
(45) Date of Patent: Feb. 6, 2024

(54) ONE-PIECE WOVEN OCCUPANT RESTRAINT SYSTEM

(71) Applicant: ZF Passive Safety Systems US Inc., Washington, MI (US)

(72) Inventors: Dylan Moran, Rochester Hills, MI (US); Bruce Hill, Bloomfield Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 86 days.

(21) Appl. No.: 17/308,521

(22) Filed: May 5, 2021

(65) Prior Publication Data
US 2022/0355759 A1 Nov. 10, 2022

(51) Int. Cl.
| B60R 21/235 | (2006.01) |
| B60R 21/231 | (2011.01) |
| D03D 11/02 | (2006.01) |
| D03D 1/02 | (2006.01) |
| B60R 21/216 | (2011.01) |

(52) U.S. Cl.
CPC ...... *B60R 21/235* (2013.01); *B60R 21/23138* (2013.01); *D03D 1/02* (2013.01); *D03D 11/02* (2013.01); *B60R 21/216* (2013.01); *B60R 2021/23509* (2013.01); *B60R 2021/23542* (2013.01); *D10B 2403/01* (2013.01); *D10B 2403/0123* (2013.01); *D10B 2505/124* (2013.01); *Y10T 442/3033* (2015.04); *Y10T 442/3179* (2015.04); *Y10T 442/3472* (2015.04)

(58) Field of Classification Search
None
See application file for complete search history.

(56) References Cited

U.S. PATENT DOCUMENTS

| 5,098,125 A | * | 3/1992 | Thornton | B60R 21/235 139/389 |
| 5,110,666 A | * | 5/1992 | Menzel | B60R 21/235 428/36.1 |
| 5,131,434 A | * | 7/1992 | Krummheuer | B60R 21/235 139/389 |
| 5,421,378 A | * | 6/1995 | Bowers | B60R 21/235 139/389 |

(Continued)

OTHER PUBLICATIONS https://patents.google.com/patent/JP6428929B2/en?oq=JP6428929B2 (Year: 2015).*

(Continued)

*Primary Examiner* — Arti Singh-Pandey
(74) *Attorney, Agent, or Firm* — TAROLLI, SUNDHEIM, COVELL & TUMMINO L.L.P.

(57) ABSTRACT

A method for manufacturing a one-piece woven (OPW) air bag includes method for manufacturing an OPW airbag. The method includes providing yarns, warping the yarns on at least one beam of a loom, and simultaneously weaving yarns into a fabric air bag structure having two layer portions defining an inflatable volume and single layer portions forming seams delimiting the inflatable volume. A plurality of the yarns overlay one another to form nonwoven alignment elements in at least one of the single layer portions. The air bag structure is cut to define the OPW air bag. The alignment elements are aligned with alignment elements on a panel. The air bag structure is sewn to the panel with the alignment elements aligned with one another.

10 Claims, 10 Drawing Sheets

(56) References Cited

U.S. PATENT DOCUMENTS

| | | | | |
|---|---|---|---|---|
| 6,220,309 | B1* | 4/2001 | Sollars, Jr. | D03D 1/02 428/101 |
| 6,328,334 | B1* | 12/2001 | Kanuma | B60R 21/235 280/730.2 |
| 6,419,267 | B1* | 7/2002 | Hashimoto | B60R 21/233 280/743.1 |
| 6,794,319 | B2* | 9/2004 | Rose, III | D03D 1/02 428/36.1 |
| 8,006,999 | B2* | 8/2011 | Suemitsu | B60R 21/235 280/730.2 |
| 2002/0145276 | A1* | 10/2002 | Veiga | B32B 27/281 280/743.1 |
| 2006/0128244 | A1* | 6/2006 | Hill | B32B 5/12 428/36.1 |
| 2007/0024031 | A1* | 2/2007 | Coleman | B60R 21/217 280/730.2 |
| 2008/0084052 | A1* | 4/2008 | Abney | B60R 21/233 280/730.2 |
| 2017/0355343 | A1* | 12/2017 | Oh | B60R 21/2334 |
| 2018/0290618 | A1* | 10/2018 | Floersheimer | B60R 21/2334 |
| 2021/0094501 | A1* | 4/2021 | Kakimoto | B60R 21/232 |

OTHER PUBLICATIONS https://patents.google.com/patent/JP6399004B2/en?oq=17308521 (Year: 2016).* https://patents.google.com/patent/EP3127758A1/en?oq=EP+3127758+A1 (Year: 2016).* https://patents.google.com/patent/KR102465245B1/en?oq=17308521 (Year: 2020).* https://patents.google.com/patent/DE102020108396B3/en?oq=JP7140866 (Year: 2020).*

Complete Textile Glossary Celanese Acetate (Year: 2001).*

* cited by examiner

ONE-PIECE WOVEN OCCUPANT RESTRAINT SYSTEM

TECHNICAL FIELD

The present invention relates generally to an apparatus for helping to protect an occupant of a vehicle. More particularly, the present invention relates to a one-piece woven (OPW), inflatable air bag and a method of manufacturing the same.

BACKGROUND OF THE INVENTION

It is known to inflate an occupant restraint system to help protect a vehicle occupant in the event of a vehicle collision. Examples of occupant restraint systems include driver and passenger frontal air bags, side air bags, center side air bags, curtain air bags, inflatable seat belts, inflatable knee bolsters, and inflatable head liners.

Occupant restraint systems can have a variety of constructions. For example, an occupant restraint system can be constructed of overlying woven panels that are interconnected by means, such as stitching or ultrasonic welding, to form connections or seams that help define an inflatable volume of the protection device. As another example, an occupant restraint system can have an OPW construction in which overlying panels are woven simultaneously. The panels are woven together to form connections or seams that help define an inflatable volume of the OPW protection device.

SUMMARY OF THE INVENTION

According to one example, a method for manufacturing a one-piece woven (OPW) air bag includes method for manufacturing an OPW airbag. The method includes providing yarns, warping the yarns on at least one beam of a loom, and simultaneously weaving yarns into a fabric air bag structure having two layer portions defining an inflatable volume and single layer portions forming seams delimiting the inflatable volume. A plurality of the yarns overlay one another to form nonwoven alignment elements in at least one of the single layer portions. The air bag structure is cut to define the OPW air bag. The alignment elements are aligned with alignment elements on a panel. The air bag structure is sewn to the panel with the alignment elements aligned with one another.

In another example, an OPW air bag includes a fabric structure having yarns woven into two layer portions defining an inflatable volume and single layer portions forming seams delimiting the inflatable volume. A plurality of the yarns overlays one another to form nonwoven alignment elements in at least one of the single layer portions. A panel includes a plurality of the yarns overlaying one another to form nonwoven alignment elements. The alignment elements on the fabric structure and the panel are aligned with one another for helping to connect the air bag structure to the panel.

In another aspect, taken alone or in combination with any other aspect, the alignment elements on the panel comprise openings.

In another aspect, taken alone or in combination with any other aspect, the alignment elements on the panel comprise overlaying yarns forming nonwoven elements.

In another aspect, taken alone or in combination with any other aspect, a locating member is inserted through the alignment element on the air bag and the associated alignment element on the panel prior to sewing the air bag structure to the panel.

In another aspect, taken alone or in combination with any other aspect, the panel forms a reinforcement panel.

In another aspect, taken alone or in combination with any other aspect, the panel forms a tether.

In another aspect, taken alone or in combination with any other aspect, the air bag structure includes the panel.

In another aspect, taken alone or in combination with any other aspect, the alignment elements on the single layer portions are secured to the alignment elements on the panel to form a bend in the air bag structure for controlling deployment of the air bag.

In another aspect, taken alone or in combination with any other aspect, each alignment element on the single layer portions comprises warp yarns extending over weft yarns.

In another aspect, taken alone or in combination with any other aspect, each alignment element on the single layer portions comprises weft yarns extending over warp yarns.

In another aspect, taken alone or in combination with any other aspect, the nonwoven alignment elements have a first stiffness that is less than a second stiffness of the single layer portions.

In another aspect, taken alone or in combination with any other aspect, the air bag structure forms a center side air bag.

Other objects and advantages and a fuller understanding of the invention will be had from the following detailed description and the accompanying drawings.

DETAILED DESCRIPTION

The present invention relates generally to an apparatus for helping to protect an occupant of a vehicle. More particularly, the present invention relates to an OPW, inflatable air bag and a method of manufacturing the same.

Figure 1:
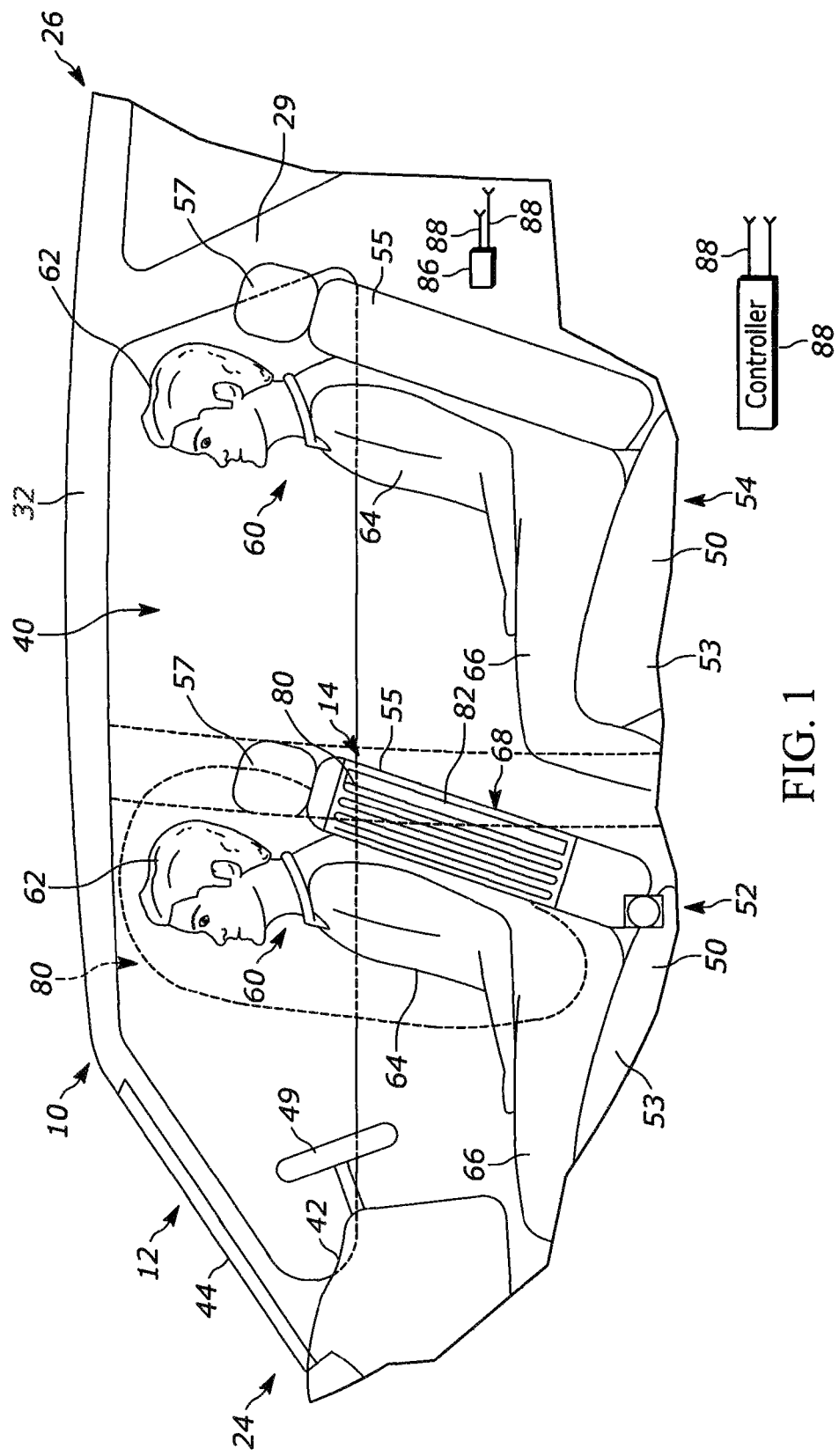
FIG. 1 is a schematic illustration of an example occupant restraint system comprising a center side air bag in a stored condition in a vehicle seat.
Figure 2A:
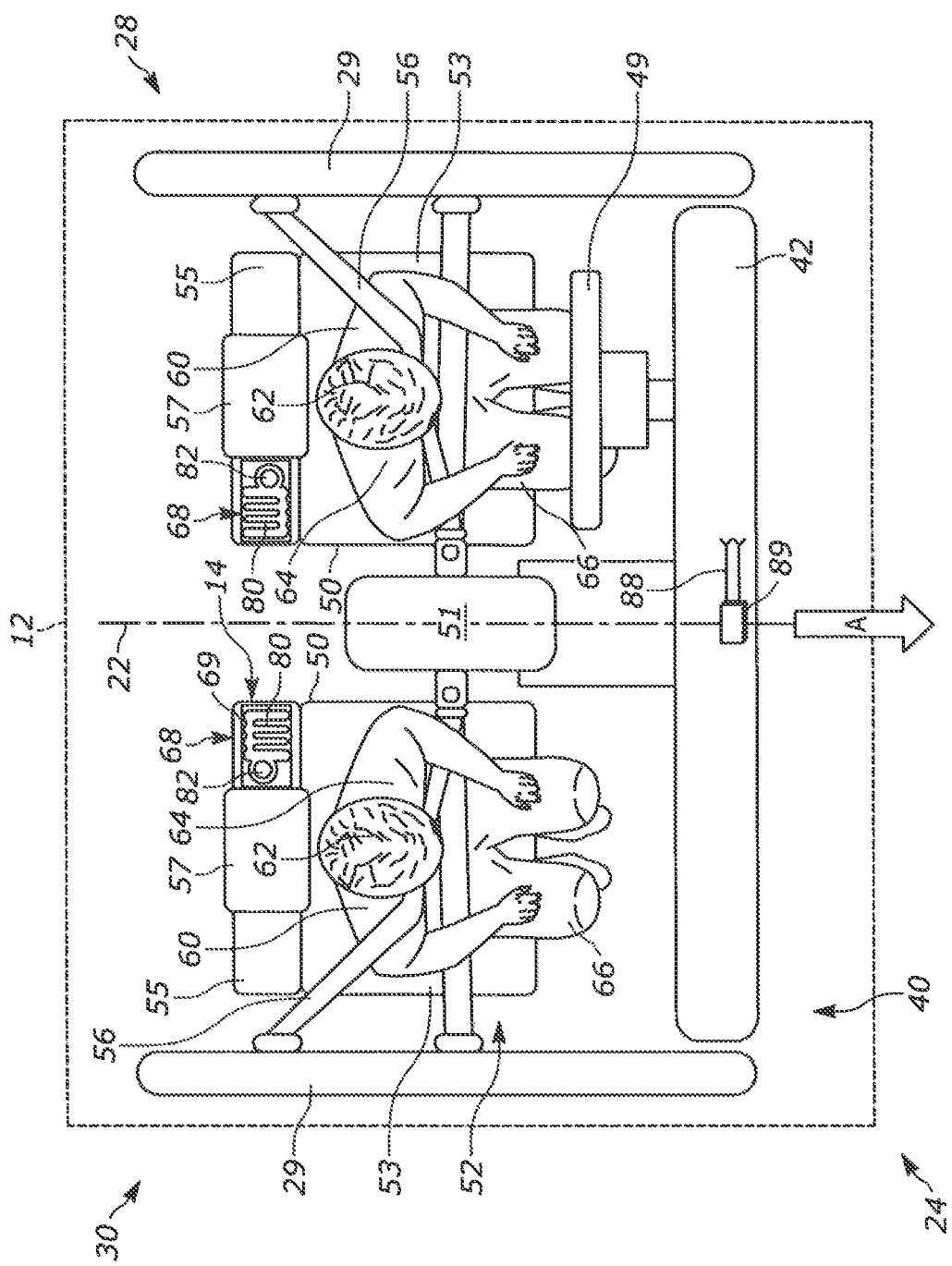
FIG. 2A is a top view of the center side air bag of FIG. 1.

FIGS. 1 and 2A illustrate an example configuration of an apparatus 10 for helping to protect one or more occupants 60 of a vehicle 12. The vehicle 12 extends along a centerline 22 from a first or fore end 24 to a second or aft end 26. The vehicle 12 extends to a left/driver side 28 and a right/passenger side 30 on opposite sides of the centerline 22. Each side 28, 30 includes side structure 29 including an A-pillar, a B-pillar, a C-pillar, and doors connected to the pillars.

The first end 24 of the vehicle 12 includes an instrument panel 42 facing a passenger compartment or cabin 40. A windshield or windscreen 44 is located between the instrument panel 42 and a roof 32. The vehicle 12 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40. In the example shown, a steering wheel 49 extends from the instrument panel 42.

Seats 50 are positioned in the cabin 40. In this open passenger cabin 40 configuration, the vehicle seats 50 can be configured, positioned, and oriented in a variety of manners, not constrained by the need to facilitate a vehicle driver/operator. For example, in FIG. 2, the seats 50 can be arranged in front and rear rows 52 and 54, respectively, oriented in a forward-facing manner similar to that of conventional automobiles. It will be appreciated that the vehicle 12 could alternatively include more or fewer rows of seats 50 (not shown). In any case, a seatbelt 56 is associated with each seat 50 for restraining an occupant 60 in that seat.

Each seat 50 includes a base or bottom 53 for receiving the legs 66 of the occupant 60. A seat back 55 extends from the base 53 towards the roof 32 and receives the upper torso 64 of the occupant 60. A headrest 57 is connected to the seat back 55 and receives the head 62 of the occupant 60.

The apparatus 10 of the example configuration is an occupant restraint system 14 that is inflatable/deployable to a position between the driver and passenger seats in the front row. In this configuration, the occupant restraint system 14 can also be referred to as a centre or center side air bag. The occupant restraint system 14 can, however, have alternative configurations.

For example, the occupant restraint system 14 can be configured for deployment in any known location of the vehicle, e.g., steering wheel, door, front seat, roof, etc. Other occupant restraint systems (not shown) that can be constructed in accordance with the invention can include, for example, curtain air bag, side impact air bags, inflatable seat belts, inflatable knee bolsters, and inflatable head liners. The apparatus 10 can therefore be used to protect the driver and/or any number of passengers in the vehicle 12.

The occupant restraint system 10 shown in FIGS. 1-2A includes at least one vehicle occupant protection device in the form of inflatable, fabric air bag structures or air bags 80 mounted in each seat 50, e.g., in the seat back 55 or seat base 53, in the front row 52. The air bag 80 associated with the right or passenger side 30 of the vehicle 12 forms a passenger side air bag. The air bag 80 associated with the left or driver side 28 of the vehicle 12 forms a driver side air bag. It will be appreciated that either or both the passenger and driver side air bags 80 can be alternatively mounted within other vehicle structure, e.g., a center console 51 between the driver and passenger seats.

With this in mind, although the air bags 80 in the respective driver side 28 and passenger side 30 seats 50 are similar the construction and operation of only the air bag on the driver side and associated with the passenger seat 50 is discussed for brevity. It will also be appreciated that one or more air bags 80 can be provided in the seat(s) 50 in the rear row 54 (not shown). That said, any reference to an occupant 60 refers to the driver occupant on the left side 28 of the vehicle 12 as opposed to the passenger occupant on the right side 30 (unless otherwise noted). Similarly, any reference to a vehicle seat 50 refers to the seat for receiving the driver occupant 60 on the left side 28 (unless otherwise noted).

An inflator 82 is fluidly connected with the center side air bag 80 and provided with the air bag in a cover or housing/module 68 that is then placed in seat 50. The inflator 82 can have a known construction suitable for inflating the center side air bag 80. For example, the inflator 82 can contain a stored quantity of pressurized inflation fluid (not shown) in the form of a gas for inflating the center side air bag 80. Alternatively, the inflator 82 can contain a combination of pressurized inflation fluid and ignitable material for heating the inflation fluid, or can be a pyrotechnic inflator that uses the combustion of gas-generating material to generate inflation fluid. As a further alternative, the inflator 82 can be of any suitable type or construction for supplying a medium for inflating the center side air bag 80. In any case, the inflator 82 includes openings (not shown) through which inflation fluid is directed into the center side air bag 80.

The vehicle 12 includes one or more sensors (not shown) for sensing the occurrence of an event for which inflation of the center side air bag 80 is desired. Examples of such events include a vehicle impact, e.g., front, rear, side, offset, or angled impacts, a vehicle rollover, or both. Upon sensing the event, the sensor provides electrical signal(s) over lead wires 88 to the inflator 82 (or a controller 89 connected thereto), which causes the inflator to be actuated in a known manner and discharge fluid under pressure into the center side air bag 80.

Figure 2B:
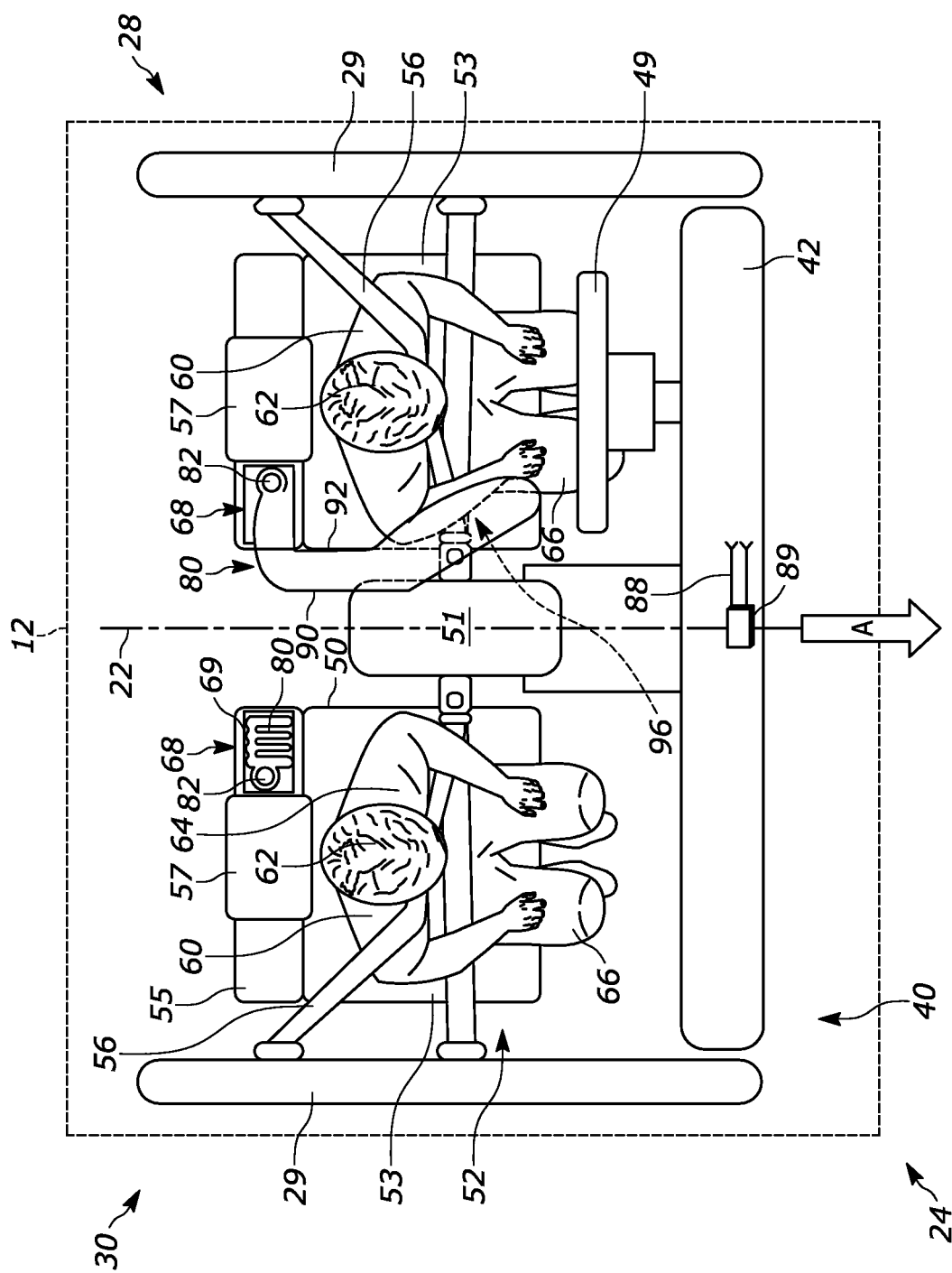
FIG. 2B is a top view of the center side air bag in a deployed condition.

The center side air bag 80 is inflatable from a deflated and stored condition, illustrated in FIGS. 1 and 2A, to an inflated and deployed condition, illustrated in FIGS. 1 and 2B. More specifically, the center side air bag 80 inflates under the pressure of the inflation fluid from the inflator 82 away from the seat back 55 and in a forward direction A of the vehicle 12 to a position between the driver seat and the passenger seat. The center side air bag 80, when inflated, helps protect the vehicle occupant 60 in the driver seat 50 in the event of an impact to the vehicle 12, a vehicle rollover, or both. The center side air bag 80, when inflated, also helps absorb the energy of impacts with the center side air bag and helps distribute the impact energy over a large area thereof.

Figure 3:
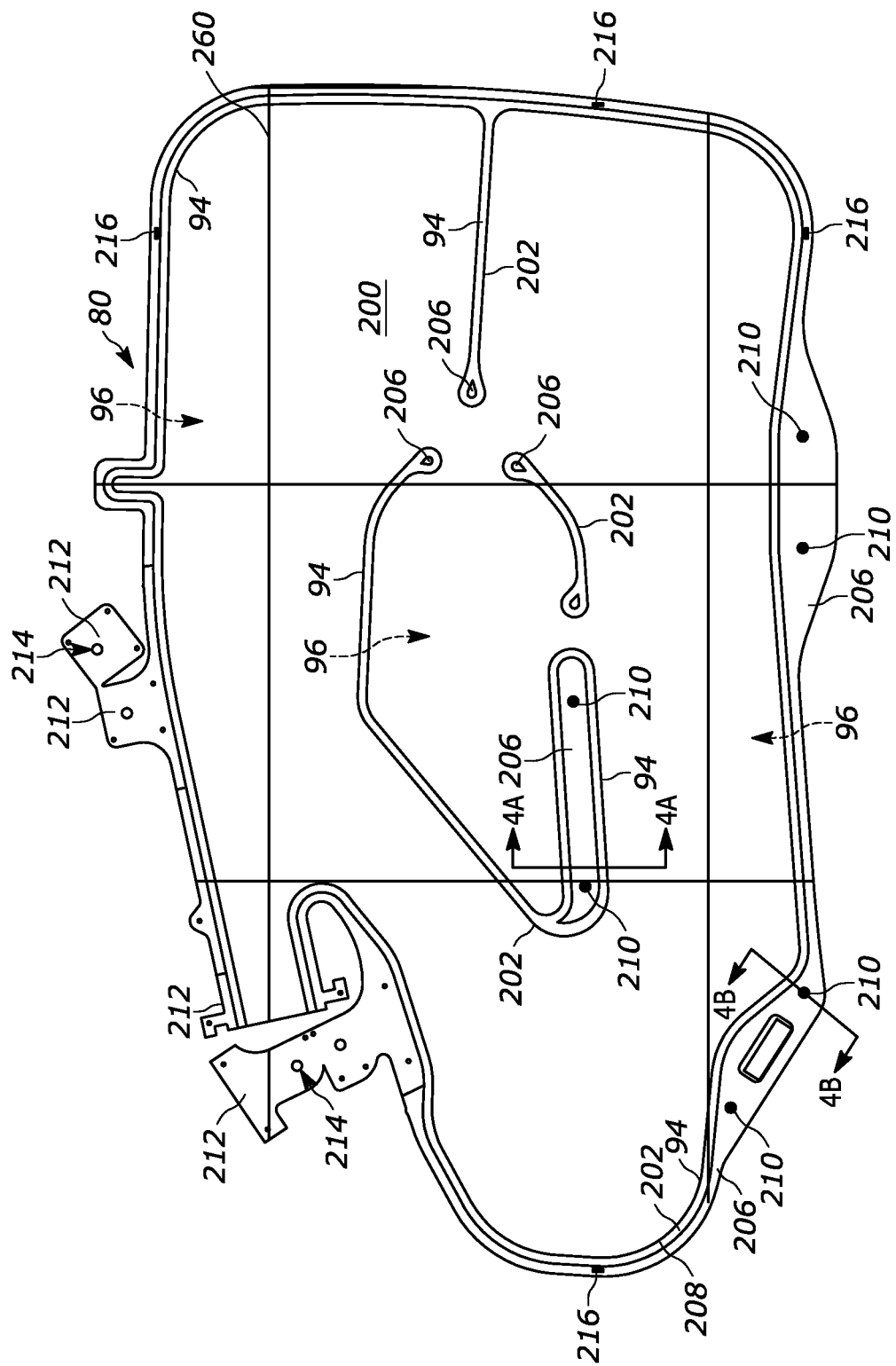
FIG. 3 is a side view of a fabric structure for forming the center side air bag.

Referring to FIGS. 2 and 3, in this example configuration, the center side air bag 80 includes integrally formed panels 90 that cooperate to define an inflatable volume 92. Seams 94 extending along the panels 90 help define inflatable chambers 96 within the inflatable volume 92 and non-inflatable portions 98. The center side air bag 80 has an OPW construction in which the air bag is a single, unitary, woven article with portions, i.e., the panels 90, woven simultaneously as separate, spaced apart layers of material, and portions, i.e., the seams 94, woven as a single layer (i.e., not apart spaced layers). The OPW construction can be especially beneficial in a center side air bag construction because this construction can afford long duration inflation and high pressurization capabilities, which can be desirable for this and other types of air bags.

The particular OPW configuration of the center side air bag 80 is by way of example only. The present invention is suited for implementation in OPW air bag structures having any configuration, e.g., multiple inflatable portions, a single inflatable portion, no inflatable portions, and any number of seams, including zero. That said, the center side air bag 80 has an OPW construction that promotes seam integrity, easier and more compact packaging, and uniform shrinkage in the weft direction. To accomplish this, the OPW construction of the center side air bag 80 is configured such that certain portions of the air bag are woven with different weave patterns. In describing the center side air bag 80, reference is made to its a length, which is measured in a warp direction (left to right as viewed in FIG. 3), and its width, which is measured perpendicular to the length and in a weft direction (top to bottom as viewed in FIG. 3).

Figure 4A:
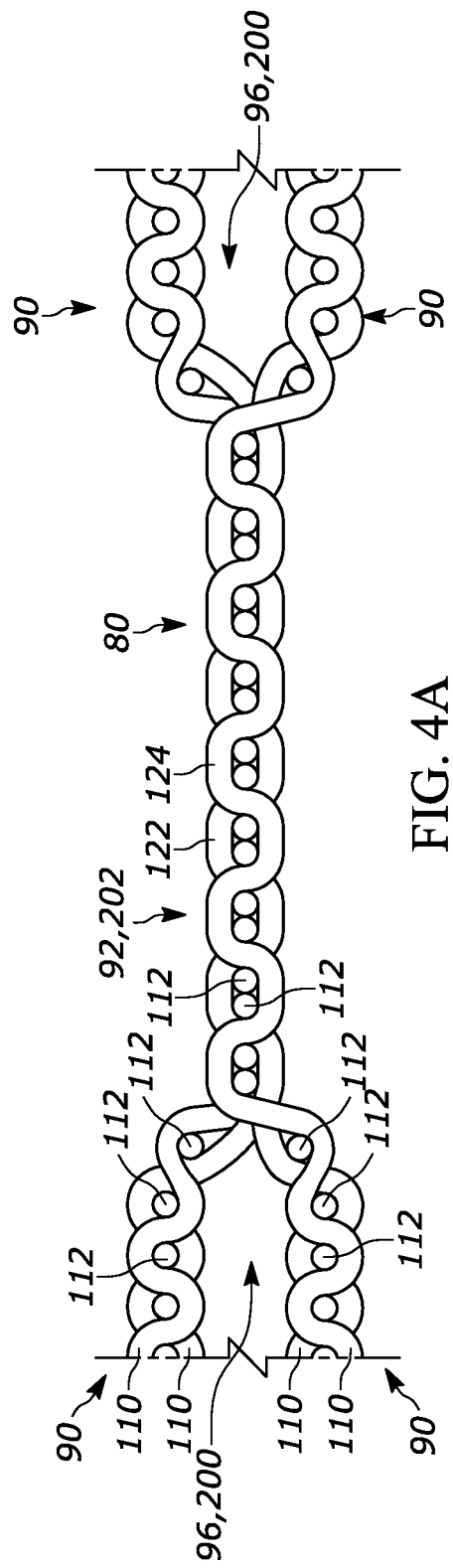
FIG. 4A is a sectional view taken generally along line 4A-4A in FIG. 3 illustrating the weave of a first portion of the fabric structure.

Referring to FIG. 4A, the panels 90 each includes a plurality of warp yarns, or "ends", indicated at 110. The panels 90 also each includes a plurality of weft yarns, or "picks," indicated at 112. The warp yarns 110 and the weft yarns 112 are oriented perpendicular to each other. The warp yarns 110 are interlaced with the weft yarns 112 in an alternating or "up and down" fashion. In areas of the center side air bag 80 other than the seams 94, each panel 90 is woven in a one-by-one (1×1) weave pattern referred to in the art as a "plain weave" pattern. In this plain weave pattern, single warp yarns 110 are interlaced around single weft yarns 112, as shown in FIG. 4A. Since the center side air bag 80 has an OPW construction, the plain weave is referred to in the art as a double layer plain weave.

Weave patterns include what are referred to in the art as "floats." A "float" refers to the number of adjacent warp yarns 110 or a weft yarns 112 that a weft yarn or warp yarn, respectively, extends over or under. The number of floats in a woven fabric varies with the particular type of weave with which the fabric is woven. For example, a plain woven fabric includes single floats because the warp and weft yarns pass over and under single weft and warp yarns, respectively. As another example, a 2×2 woven fabric includes two floats because the warp yarns and weft yarns pass over and under two adjacent weft and warp yarns, respectively.

The seams 94 have constructions that vary from the plain weave pattern in order to provide a desired function for the particular seam. In the portion illustrated in FIG. 3, the seam 94 has a non-plain, two-by-two (2×2) followed by a three-by-three (3×3) weave pattern, hereafter referred to as a low float weave pattern. Low float weave patterns are shown and described in U.S. Patent Publication No. 2006/0284403 A1.

In this 1×2 weave pattern, the warp yarn 110 identified at 122 is a first warp yarn and the warp yarn identified at 124 is a second warp yarn. The yarns 122 and 124 are interlaced alternately over and under groups of two weft yarns 112. Each warp yarn 110 is interlaced on opposite sides of each weft yarn 112. It will be appreciated, however, that the seam 94 can have an alternative non-plain weave pattern, examples of which are noted below.

In areas of a fabric where different weave patterns interface with each other floats in addition to those normally occurring in the weave patterns may occur. This is especially relevant in an OPW air bag design where a double layer plain weave interfaces with a non-plain weave pattern, e.g., at the transitions between the inflatable chambers 96 and the seam 94. The number and location of these excess floats is determined by the weave pattern of the fabric at the interface. While the existence of excess floats at the interface may be unavoidable, the weave pattern may be configured, to a large extent, to help place a desired number of floats in a desired location at the interface between the weave patterns.

In the example configuration, the center side air bag 80 includes both plain woven portions and non-plain woven portions. Portions 200 of the center side air bag 80 identify portions of the woven panels 90 woven in separate layers with a plain weave. Portions identified at 202 of the center side air bag 80 identify portions of the woven panels 90 woven together with the 1×2 low float weave pattern to help form the seams 94 of the center side air bag 80. The portions 202 forming the seams 94 can have alternative weave patterns, one or more of: a 3×3 panama weave pattern, an alternative basket weave pattern and/or a weave repeat pattern.

A portion identified at 206 extends around the entire periphery 208 of the center side air bag 80 and identifies portions of the panels 90 woven together with a BST 99 weave pattern. One or more portions 206 can also be provided interior of the periphery 208. The portions 206 are single layer/non-inflated portions.

One or more alignment elements 210 are provided within one or more of the portions 206 and therefore provided in the single layer/non-inflated portions spaced from the inflatable portions 92, 96 of the air bag 80. In one example, the alignment elements 210 are formed by not interweaving the warp yarns 110 and fill yarns 112 in a predefined area within the portion 206. In other words, predefined areas of nonwoven yarns 110, 112 are provided within areas of interwoven yarns 110, within one or more of the portions 206 to define alignment elements 210.

Figure 4B:
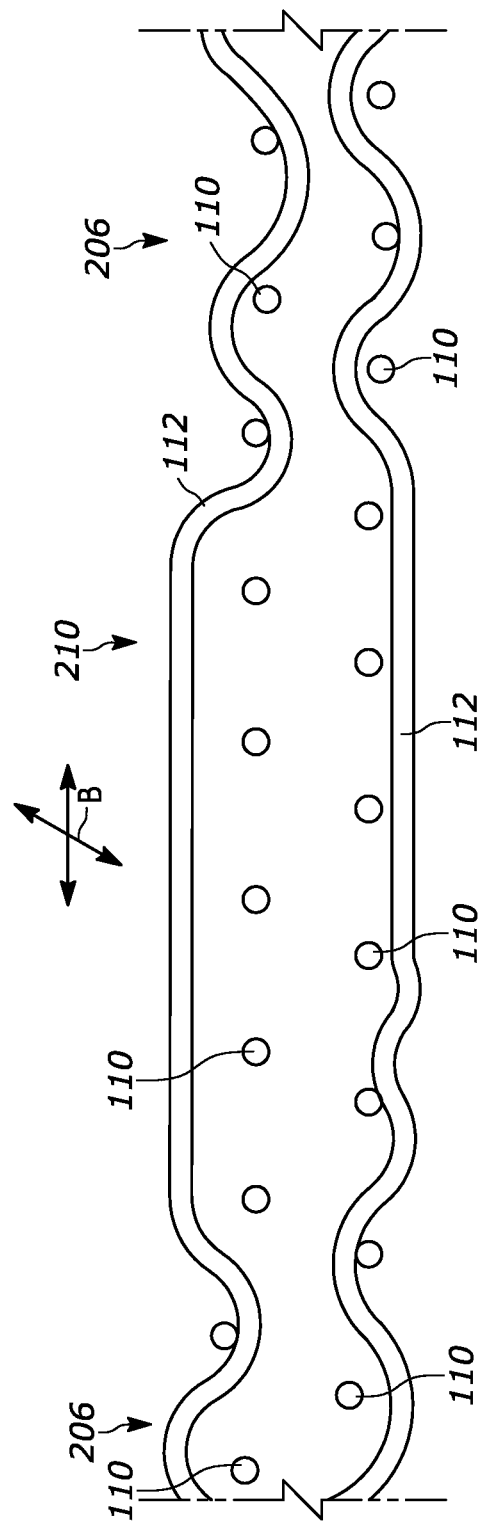
FIG. 4B is a sectional view taken generally along line 4B-4B in FIG. 3 illustrating the weave of a second portion of the fabric structure.
Figure 4C:
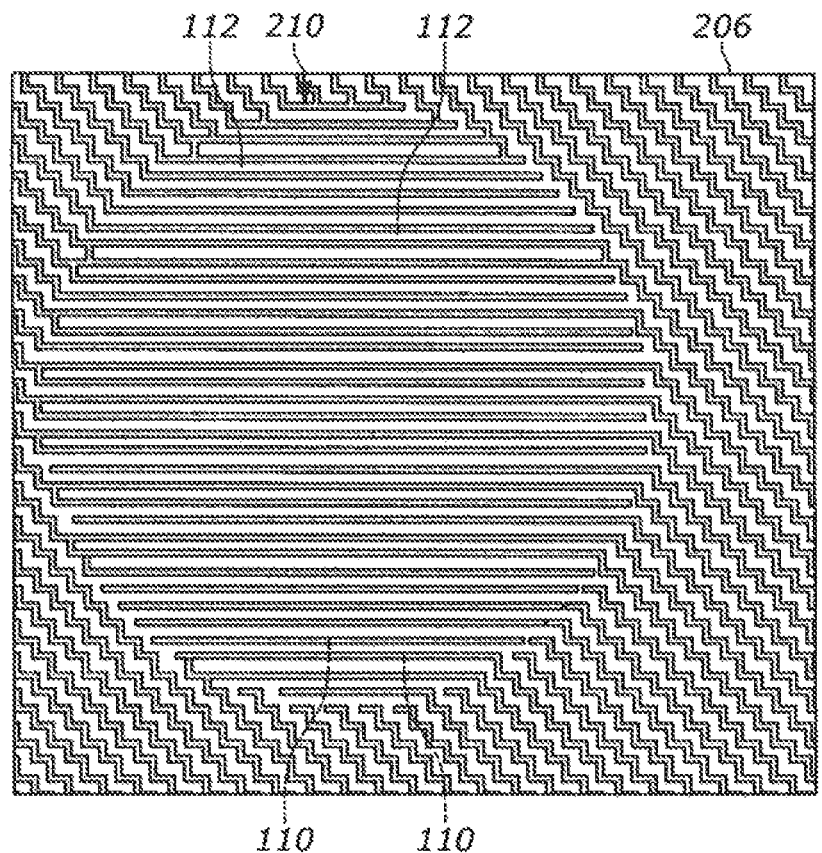
FIG. 4C is an enlarged view of a portion of FIG. 3.

To this end, and referring to FIGS. 4B-4C, the warp yarns 110 can be hidden within the weft yarns 112. That is to say, the warp yarns 110 can be sandwiched between the weft yarns 112. In the adjacent picks, the weft yarns 112 can be hidden within the warp yarns 110. This alternating pattern continues across the entire alignment element 210 to form the structure illustrated in FIG. 4C

Alternatively, the warp yarns 110 can overlay the fill yarns 112 in the area or the fill yarns can overlay the warp yarns in the area. In any case, in the example shown, first, second, and third pairs 210a-210c of alignment features are provided within the portions 206 (FIG. 3). More or fewer alignment features 210, in pairs or otherwise, in the same or different locations, are contemplated based on the application.

Regardless, the nonwoven portions of the yarns 110, 112 defining the alignment elements 210 are by nature relatively looser compared to the adjacent woven portions 206 of the yarns. In other words, while the woven yarns 110, 112 are tightly secured together (relatively greater stiffness) to prevent relative movement therebetween, the nonwoven portions of the yarns are capable of moving relative to one another (relatively lesser stiffness) in the manner/directions indicated generally at B without undue force. In this sense, the nonwoven portions of the yarns 110, 112 are capable of moving relative to one another sufficient to create spaces or openings therebetween.

The alignment elements 210 are provided to help secure the air bag 80 to at least one of itself and another panel of material. To this end, the alignment elements 210 can be used to align one portion of the air bag 80 with another, folded portion of the air bag. Alternatively or additionally, the alignment elements 210 can help align the air bag 80 with a panel of material used as a reinforcement panel and/or a tether for helping to strengthen and/or shape the air bag during deployment.

Returning to FIG. 3, portions identified by cross-hatching at 212 of the center side air bag 80 are provided along the top of the periphery 208. Each portion 212 includes one or more openings 214 that receive fasteners (not shown) to help secure the center side air bag 80 to the seat 50, e.g., to the frame of the seat back 55. The portions 212 identify portions of the panel 90 woven together with a panama weave pattern, e.g., a 4×3×4×3 panama weave pattern.

Portions 216 of the center side air bag 80 are provided at the front and rear ends of the center side air bag and identify portions of the panels 90 woven together with a measure marker weave pattern. It will be understood that any of the portions 206, 210, 212, 216 can exhibit alternative weave patterns known in the art.

The plain woven and non-plain woven portions of the panels 90 can have different gas permeabilities. For example, the non-plain woven portions can have a higher gas permeability than the plain woven portions due to the looser weave and higher propensity for yarn shifting in the non-plain weave. To this end, an outer coating and/or lamination 230 can be applied to the panels 90 to help control the gas permeability of the panels and maintain the gas permeability of the panels at a desired level.

The coating 230 can be any coating suited to provide desired permeability characteristics. For example, the coating 230 can comprise a gas impermeable or substantially gas impermeable urethane or silicone material. In any case, the center side air bag 80 can thus maintain the improved seam integrity and packaging provided by the plain and non-plain woven portions described above without sacrificing gas permeability.

Figure 5:
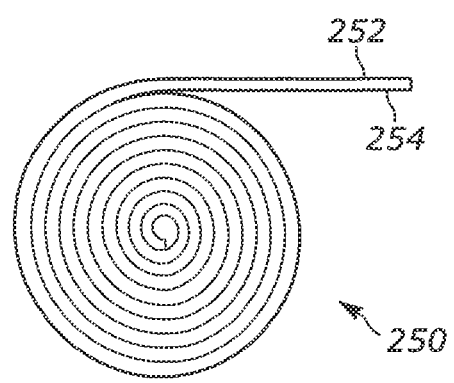
FIG. 5 is a side view of a roll of fabric material for forming the fabric structure of FIG. 3.
Figure 6:
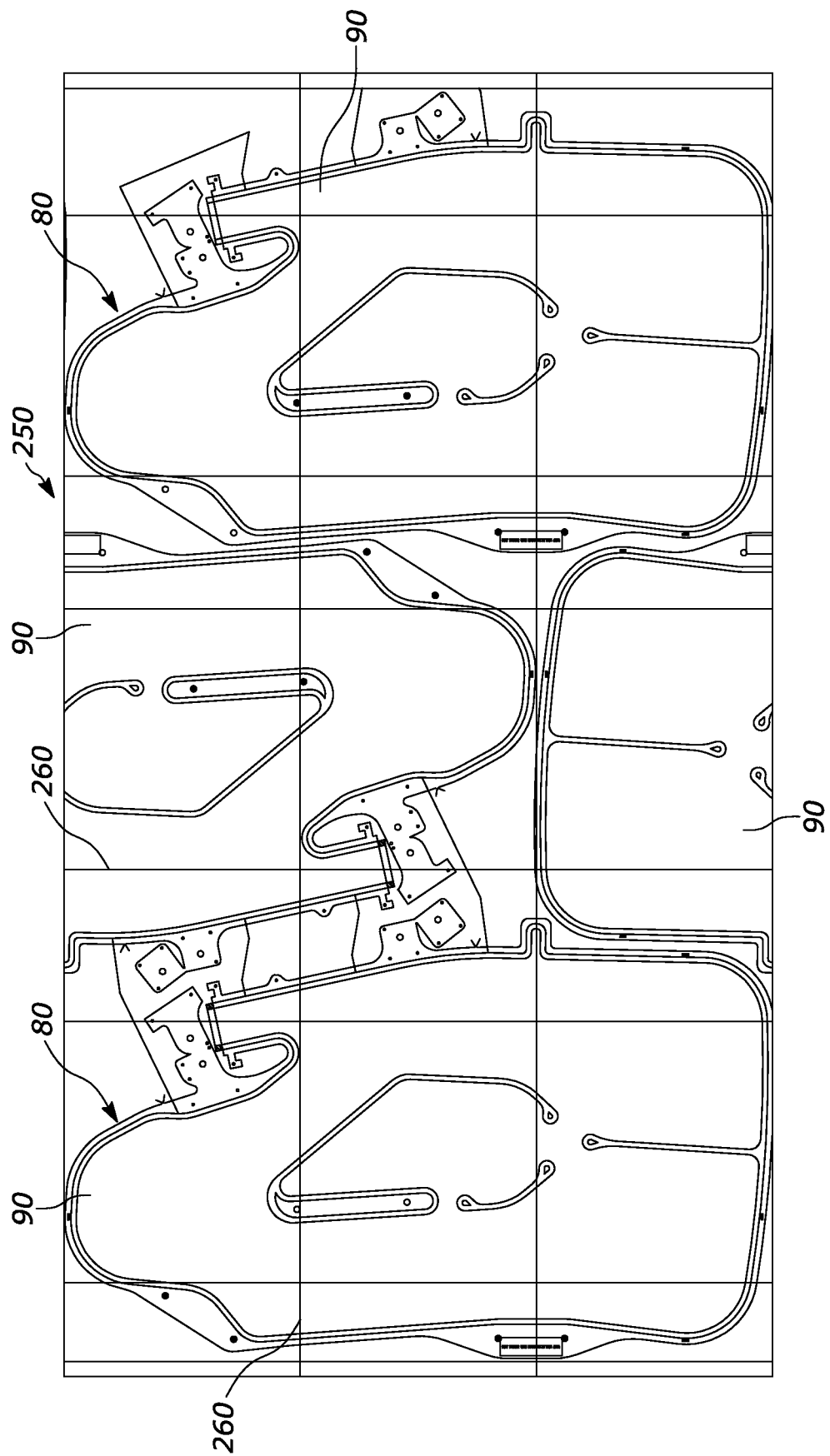
FIG. 6 illustrates the roll of FIG. 5 in an unfurled state.

The panels 90 used to construct the center side air bag 80 are formed in a continuous roll of fabric material 250, shown in FIG. 5 (rolled) and FIG. 6 (unrolled). The weave patterns used to weave the panels 90 are selected to promote processing the woven roll 250 of material. Once the roll 250 is produced and any coating(s) 230 applied, the panels 90 are cut out from the roll to define the center side air bag 80. This cutting can be performed by cutting machines (not shown) that use vision systems to help improve cutting accuracy.

The vision systems search for markers on the fabric of the roll 250 that allow the system to determine whether cuts are being made at the proper locations. Typically, these markers comprise intersecting marker yarns 260 (FIG. 6) woven into the fabric of the panels 90 when the roll 150 in an unfurled state. The marker yarns 260 have a color that is different from the rest of the fabric on the roll 250 and therefore stand out visually. The marker yarns 260 are visible on a first side 252 of the roll 250, with a second, opposite side 254 of the roll being white.

To weave the intersecting marker yarns 260, non-white colored yarns are inserted at specific locations on the war beam (or directly at the loom). To form the marker yarn 260 intersections, yarns are inserted at the appropriate weft locations along the length of the roll 250. As a result, a grid of warp and weft marker yarns 260 is formed on the first side 252 of the roll 250. The marker yarns 260 can be, for example, 470 dtex black marker yarns capable of being recognized by the vision system.

Figure 7A:
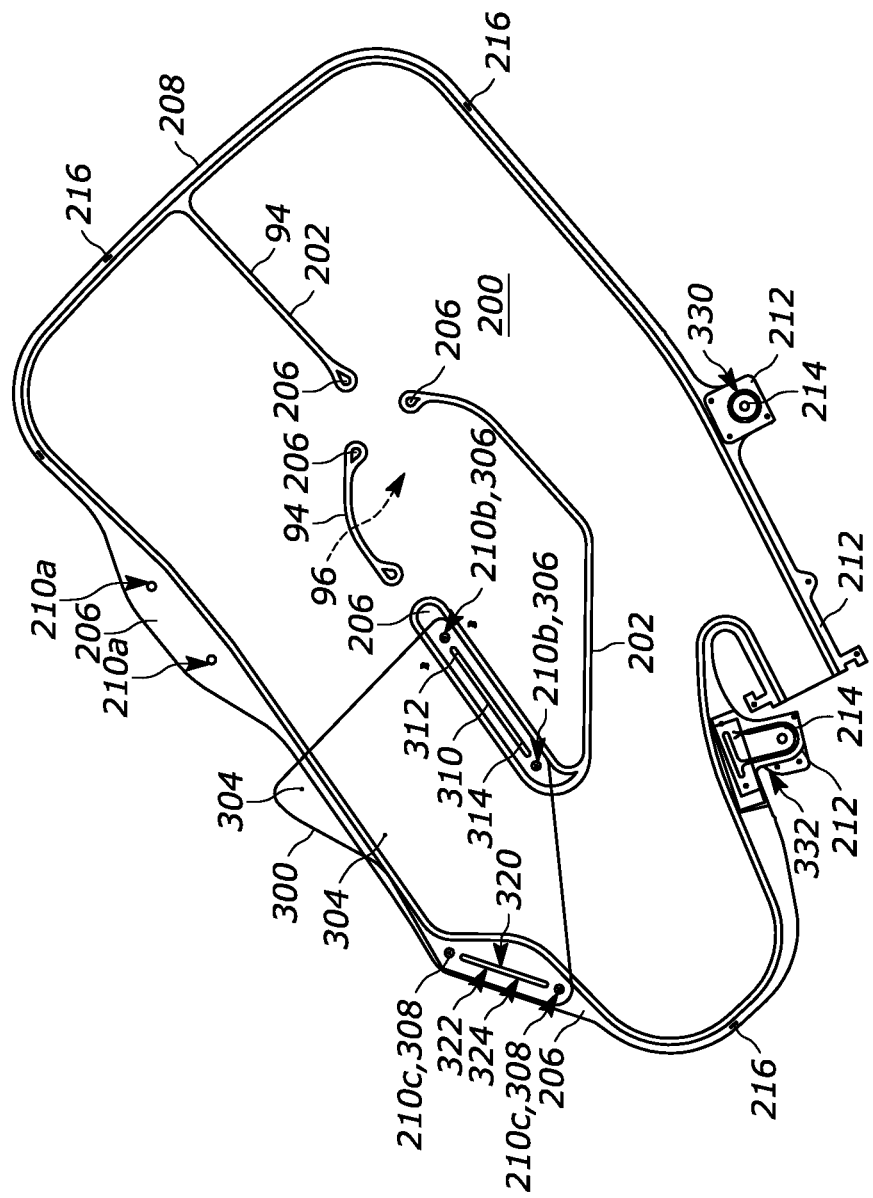
FIG. 7A is a schematic illustration of a first step of forming the center side air bag.

In accordance with the present invention, the nonwoven alignment features 210 are used to help secure the cut air bag 80 to itself and/or to additional panels of material. Referring to FIG. 7A, an additional panel 300 is provided that acts as both a reinforcement panel and a tether. The additional panel 300 includes a first, second, and third pairs of alignment elements 304, 306, 308, which can constitute openings formed in the panel or nonwoven elements similar to the construction of the alignment elements 210.

The second alignment elements 306 in the panel 300 are aligned with the nonwoven alignment elements 210*b* in the air bag 80. The third alignment features 308 in the panel 300 are aligned with the alignment elements 210*c* in the air bag 80. Locating members 311 (see inset), such as dowel pins, are extended through each pair of respective aligned elements 210*b*, 210*c*, 306, 308. This locates and orients the panel 300 relative to the air bag 80 in a precise, predetermined, overlapping manner. It will be appreciated that only the yarns 110, 112 associated with the alignment feature 210*c* are shown in the inset for clarity. In actuality, the yarns forming the alignment elements 308 would likewise be present.

Since the alignment elements 210*b*, 210*c*, 306, 308 constitute nonwoven yarns overlaid on one another, the yarns are capable of being displaced to enable passage of the locating members 311 through the air bag 80 and panel 300. In other words, the nonwoven yarns 110, 112 move relative to the adjacent woven yarns in the manner B to readily accept the locating members 311 through the alignment elements 210*b*, 210*c*, 306, 308.

Once the air bag 80 and panel 300 are aligned by the locating members 311 stitching 310, 320 is provided through the air bag and panel to secure the same together. The stitching 310 extends between the alignment elements 210*b*, 306 from a first end 312 to a second end 314. The ends 312, 314 can overlap one another. The stitching 320 extends between the alignment elements 210*c*, 308 from a first end 322 to a second end 324. The ends 322, 324 overlap one another. Furthermore, the portions 212 can be symmetrically folded to align the respectively openings 214. Stitching 330, 332 then secures the folded over portions 212, respectively, together.

Figures 7B, 8:
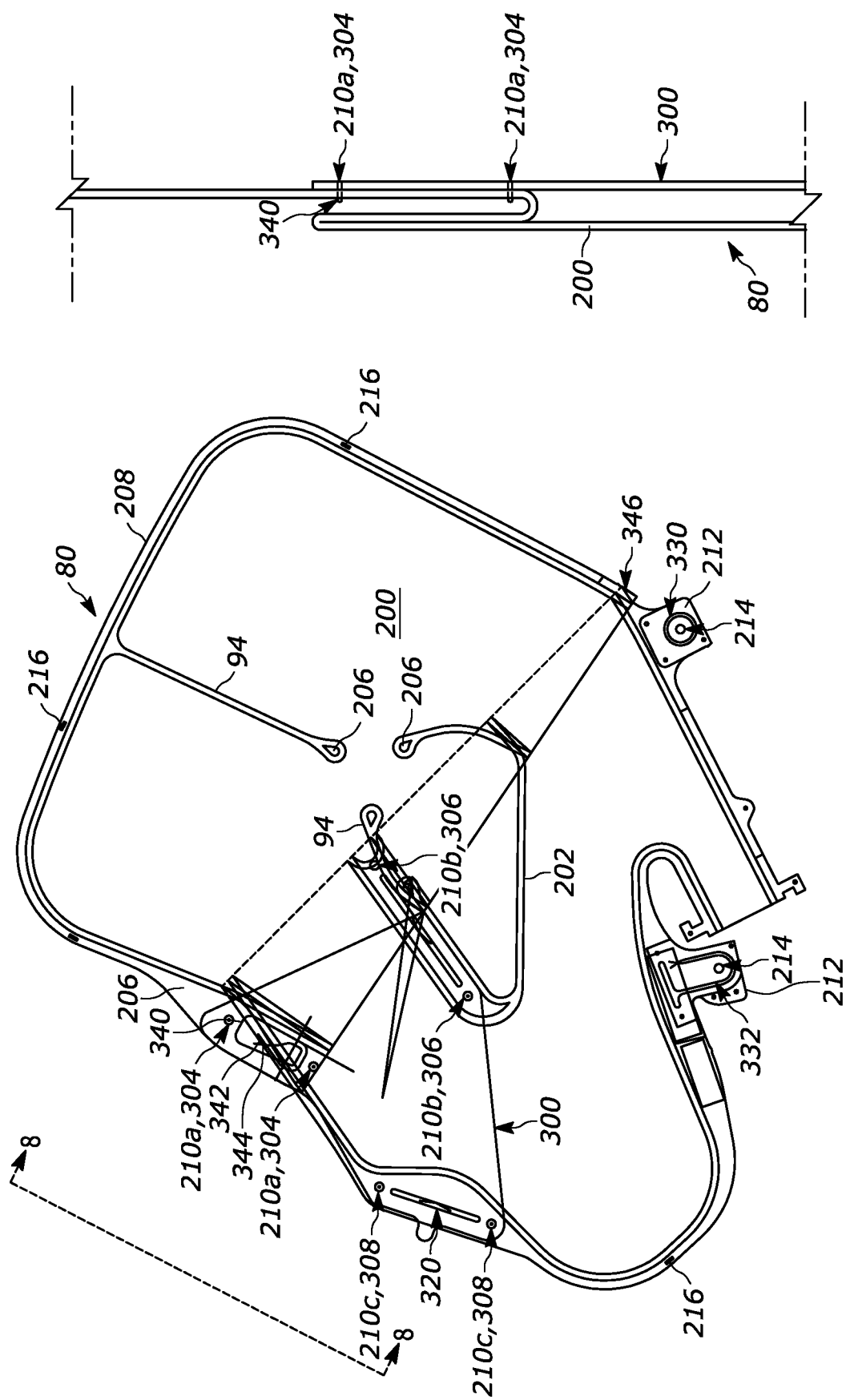
FIG. 7B is a schematic illustration of a second step of forming the center side air bag.
FIG. 8 is a side view of the center side air bag of FIG. 7B.

Turning to FIGS. 7B and 8, the air bag 80 is then folded about a centerline 326 in the manner A towards the panel 300 until the first alignment elements 210*a* on the air bag are aligned with the first alignment elements 304 on the panel 300. Locating members 311 are extended through each pair of respective aligned elements 210*a*, 304 to align the folded portion of the air bag 80 with the panel 300. Stitching 340 is provided through the folded portion of the air bag 80 and the panel 300 to secure the same. The stitching 340 extends between the alignment elements 210*a*, 304 from a first end 342 to a second end 344. The ends 342, 344 can overlap one another. Due to this configuration, a fold or bend 346 is formed in the air bag 80.

Referring back to FIG. 2B, when the air bag 80 is inflated and deployed, the bend 346 acts to direct and control deployment of the air bag in a predetermined manner. To this end, the bend 346 restrains a portion of the air bag 80 from fully deploying, resulting in an angled or substantially L-shaped air bag 80 when viewed from above. In this manner, the panel 300 acts as a tether to direct/control air bag 80 deployment. This advantageously helps to protect an occupant 60 in the event of a crash scenario in which the occupant moves in the inboard/inboard-forward direction.

Figure 9:
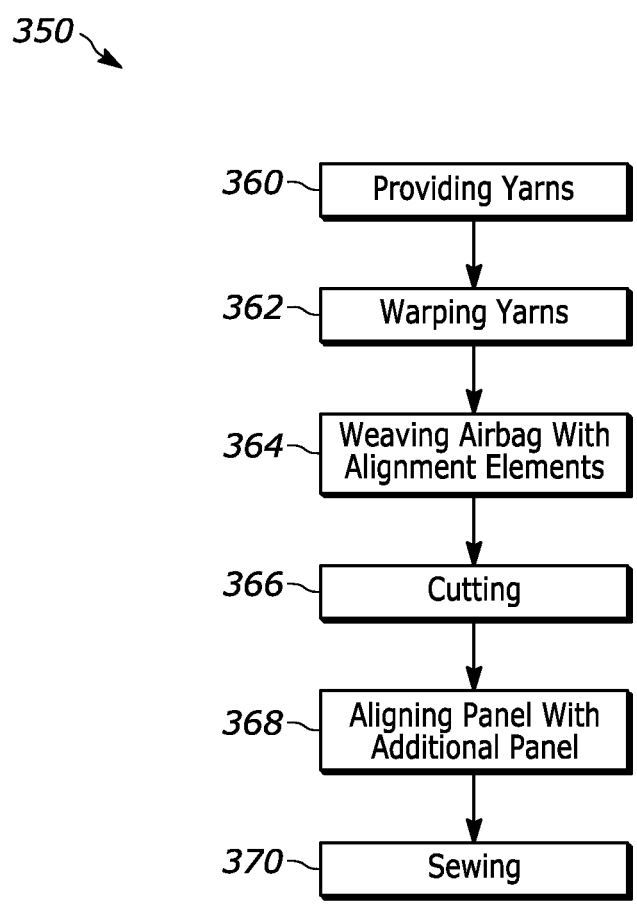
FIG. 9 is a flow chart illustrating a method of forming the center side air bag of FIG. 7B.

In one example method 350 for forming the center side air bag 80 shown in FIG. 9, at step 360 yarns are provided. At step 362, the yarns are warped on at least one beam of a loom, e.g., an air-jet loom or rapier loom. At step 364, the warped yarns are woven on the loom to form the roll 250 having an OPW construction and including the nonwoven alignment elements 210. The roll 250 of loom-state yarn can be coated with the coating 230 (not shown). At step 366, the coated roll 250 is cut to the pattern shown in FIG. 7A to define the center side air bag 80. At step 368, the panel 300 is aligned with the air bag 80 using the respective alignment elements 210*a-c*, 304, 306, 308. At step 370, the air bag 80 and panel 300 are stitched together. It will be appreciated that steps 368 and 370 can involve one or more iterations of aligning the components and stitching them together. The locating members 311 may or may not be used.

Using nonwoven portions of the air bag to define the alignment elements—as opposed to cutting the alignment openings after weaving—advantageously helps to provide more precisely located openings and reduces cutting time. More specifically, during current air bag manufacturing processes, the alignment openings for the locating members are laser cut after all the weaving and stitching steps are performed to construct the air bag prior to securing any additional panel(s) thereto.

To this end, the alignment openings are typically positioned/located based on the marker yarns. The weaving process, however, can induce localized distortion of the yarns away from the marker yarns. As a result, the computer program locating the alignment openings can undesirably position the alignment openings for cutting at positions that are too close to a seam and/or the inflatable volume. Moreover, tolerances in the laser cutting program can exacerbate relatively smaller deviations from ideal alignment opening positions. If the alignment openings were then cut at the seam and/or inflatable volume, the entire air bag might need to be discarded.

That said, integrating the alignment features into the weaving program, and thereby forming the alignment features during the weaving process, not only advantageously helps to remove positional issues due to yarn distortion and laser cutting tolerances but also reduces the total laser cutting operation time.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations.

Having described the invention, the following is claimed:

1. An air bag comprising:
   a one-piece woven (OPW) fabric structure comprising yarns woven simultaneously to form two separate woven fabric single layer portions that define an inflatable volume of the air bag and single layer portions forming seams delimiting the inflatable volume, a plurality of the yarns in at least one area of at least one of the single layer portions being nonwoven and left overlaying one another to form nonwoven alignment elements in the at least one single layer portion; and
   a woven panel comprising woven yarns, wherein a plurality of the yarns in at least one area of the panel are nonwoven and left overlaying one another to form nonwoven alignment elements in the panel, the alignment elements in the OPW fabric structure and the alignment elements in the panel being configured to receive a locating member that aligns the OPW fabric structure and the panel to so that the panel can be connected to the OPW fabric structure.

2. The air bag of claim 1, wherein the panel comprises a tether configured to be connected to the OPW fabric structure to control deployment of the air bag.

3. The air bag of claim 1, wherein the panel is formed as a single layer portion of the OPW fabric structure.

4. The air bag of claim 1, wherein the panel when connected to the OPW fabric structure is configured to produce a bend in the OPW fabric structure when inflated, the bend being for controlling deployment of the air bag.

5. The air bag of claim 1, wherein each alignment element on the single layer portions comprises a plurality of warp yarns extending over a plurality of weft yarns.

6. The air bag of claim 1, wherein each alignment element on the single layer portions comprises a plurality of weft yarns extending over a plurality of warp yarns.

7. The air bag of claim 1, wherein the nonwoven alignment elements have a first stiffness that is less than a second stiffness of a remainder of the single layer portions.

8. The air bag of claim 1, wherein the air bag structure forms a center side air bag for being mounted on an inboard side of a vehicle seat.

9. The air bag of claim 1, wherein each alignment element on the single layer portions comprises warp yarns sandwiched between weft yarns.

10. The air bag of claim 1, wherein each alignment element on the single layer portions comprises weft yarns sandwiched between warp yarns.

* * * * *